United States Patent [19]

Kamada et al.

[11] 4,287,227
[45] Sep. 1, 1981

[54] COATING COMPOSITION AND PROCESS FOR PRODUCING SYNTHETIC RESIN MOLDINGS BY USING THE SAME

[75] Inventors: Kazumasa Kamada; Isao Sasaki; Kenji Kushi, all of Ohtake, Japan

[73] Assignee: Mitsubishi Rayon Co., Ltd., Tokyo, Japan

[21] Appl. No.: 109,245

[22] Filed: Jan. 3, 1980

[30] Foreign Application Priority Data

Jan. 17, 1979 [JP] Japan .................................. 54-4569
Jun. 18, 1979 [JP] Japan ................................. 54-77295

[51] Int. Cl.$^3$ ............................................. B05D 3/06
[52] U.S. Cl. ............................. 427/54.1; 204/159.13; 204/159.22; 204/159.23; 204/159.24; 264/1.1; 264/22; 351/166; 427/44; 427/164; 427/420; 427/421; 427/429; 428/412; 428/442; 428/500; 526/194
[58] Field of Search ..................... 204/159.13, 159.15, 204/159.16, 159.22, 159.23, 159.24; 427/54.1, 163, 165, 168, 169, 428, 429, 430.1; 264/1, 22; 428/412, 447; 260/29.1 SB; 526/194, 911

[56] References Cited

U.S. PATENT DOCUMENTS

| | | | |
|---|---|---|---|
| 3,940,360 | 2/1976 | Carder | 260/29.1 SB |
| 4,130,708 | 12/1978 | Friedlander et al. | 204/159.13 X |
| 4,143,013 | 3/1979 | Jenkinson et al. | 260/29.1 SB |
| 4,199,421 | 4/1980 | Kamada et al. | 204/159.22 |

Primary Examiner—Ronald H. Smith
Assistant Examiner—Thurman K. Page
Attorney, Agent, or Firm—Oblon, Fisher, Spivak, McClelland & Maier

[57] ABSTRACT

A coating composition comprising a monomer mixture of mono- or polypentaerythritol hving at least three (meth) acryloyloxy groups and at least one monofunctional acrylate or methacrylate having at least one ether bond in the molecule, a boiling point above 150° C. under normal pressure and a viscosity below 20 centipoises at 20° C., a photosensitizing agent, at least one silicon containing surface active agent and at least one organic solvent capable of forming a uniform solution upon mixing with the vinyl monomer mixture. Also disclosed is a process of coating surfaces with the coating compositions.

13 Claims, No Drawings

COATING COMPOSITION AND PROCESS FOR PRODUCING SYNTHETIC RESIN MOLDINGS BY USING THE SAME

BACKGROUND OF THE INVENTION

1. Field of the Invention

The present invention relates to coating compositions which form a transparent cross-linked hardened film high in abrasion resistance even under small loads, surface smoothness, flexibility, heat resistance, solvent resistance, durability and adhesion to the coated base. These coating compositions may be cured by irradiation with ultraviolet rays in air. This invention also relates to a process for producing synthetic resin moldings improved in the abrasion resistance and surface smoothness using these coating compositions.

2. Description of the Prior Art

Moldings produced from resins such as polymethyl methacrylate, polycarbonate and polyallyldiglycol carbonate are not only lighter in weight and higher in shock resistance, but are also less expensive and easier to mold than glass products and are therefore used in many fields such as organic glass plates, illuminating device covers, optical lenses, spectacle lenses, reflectors, mirrors, sign boards, displays, artificial tooth, name plates, dust cover cases and automobile parts where glass would otherwise have been used.

However, conventional synthetic resin moldings have a serious defect in that they are so deficient in surface abrasion resistance that their surfaces will be damaged by contact with other objects, shocks and scratches during the transportation of the molded articles.

In order to improve the abrasion resistance, it has been suggested to coat the surface of these synthetic resin products with a silicone or melamine-type coating material which is then hardened. However, such techniques suffer from several defects. For example, in both techniques, a thermosetting method is used and therefore in order to harden the coating material, it is necessary to heat it at a high temperature for a long time. Therefore, the apparatus must be large, the productivity will be reduced and the production cost will be high. As to performance, in the former technique, the adhesion of the coating material to the base is not adequate and cracks are likely to occur at the time of working or using the product. In the latter technique, the abrasion resistance of the film is not sufficient and its adhesion to the base is low.

In addition to the techniques mentioned above, there is a procedure wherein a polyfunctional acrylate or methacrylate monomer having at least three polymerizable (meth)acryloyloxy groups in one molecule is applied as a coating material to the surfaces of the synthetic resin molding and which is irradiated with active energy rays to form a cross-linked hardened film by free radical polymerization on the surface of the synthetic resin molding.

The polymerization activity of these polyfunctional (meth)acrylate (meaning acrylate or methacrylate hereinafter) monomer is so high where irradiated with active energy rays that it has been suggested as a quick drying ink material in U.S. Pat. Nos. 3,661,614; 3,551,311; and 3,551,246 and British Pat. No. 1,198,259. Use of such polyfunctional (meth)acrylate monomer as a surface modifier of synthetic resin moldings has been suggested in U.S. Pat. Nos. 3,552,986; 2,413,973; and 3,770,490.

A method of improving the abrasion resistance of synthetic resin molded surfaces by using a polyfunctional (meth)acrylate having at least three (meth)acryloyloxy groups has been suggested in U.S. Pat. Nos. 3,968,304 or 3,968,309. In these procedures, a film is formed without using an organic solvent and it is hardened by irradiation with active energy rays in an inert gas atmosphere.

It has been discovered that polyfunctional (meth)acrylate monomers are effective in improving the abrasion resistance of the surface of a synthetic resin molding as disclosed, for example, in U.S. patent application Ser. No. 878,830, filed Feb. 17, 1978, and now U.S. Pat. No. 4,199,421.

However, the polyfunctional monomers used in such techniques have high viscosities which make it difficult to obtain a smooth coating on synthetic resin molded products. This is a particular problem where the final product is to be used in optical applications, where its value is reduced because of the uneven surface.

Accordingly, a need exists for a composition which can be used to coat synthetic resin articles to improve their surface hardness. In particular, for a composition which forms smooth surface coatings. An additional need exists for a coating composition which does not whiten or become opaque when applied to molded resin articles.

SUMMARY OF THE INVENTION

Accordingly, it is an object of this invention to provide a coating composition for molded resin articles which hardens to a smooth surface.

It is a further object of the present invention to provide a coating composition which does not whiten or become opaque when applied to molded resin articles.

These and other objects of the present invention have been attained by coating compositions comprising polyfunctional (meth)acrylate monomers and a silicone surface active agent.

In particular, these and other objects are attained with coating compositions which can be hardened by ultraviolet rays in air comprising:

(a) a monomer mixture comprising 30 to 90% by weight of at least one poly(meth)acrylate of mono or polypentaerythritol having at least three (meth)acryloyloxy groups in one molecule and represented by general formula (I):

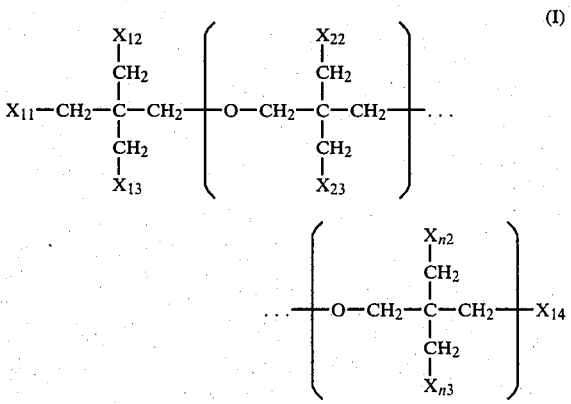

(wherein at least three of $X_{11}$, $X_{12}$, $X_{13}$, $X_{22}$, $X_{23}$, ... $X_{n2}$, $X_{n3}$ and $X_{14}$ are $CH_2=CR-COO-$ groups and the rest are —OH groups, n is an integer of 1 to 5 and R represents hydrogen or a methyl group) and 70 to 10% by weight of at least one monofunctional acrylate or methacrylate having at least one ether bond in one molecule, a boiling point above 150° C. under the normal pressure and a viscosity below 20 centipoises at 20° C.;

(b) 0.01 to 10 parts by weight of a photosensitizing agent per 100 parts by weight of said monomer mixture;

(c) 0.0001 to 2.0 parts by weight of at least one silicon type surface active agent represented by the general formula (II) or (III) per 100 parts by weight of said monomer mixture:

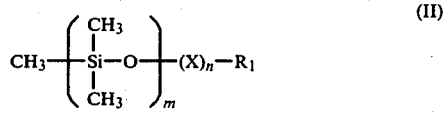

wherein X is

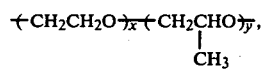

m and n are positive integers being smaller than 200, and x and y represent 0 or positive integers being smaller than 200 which satisfy the formula $0.1 \leq (xn+yn/2m) \leq 10$ and $R_1$ represents —H or an alkyl, acyl or aryl group having 1 to 6 carbon atoms, or

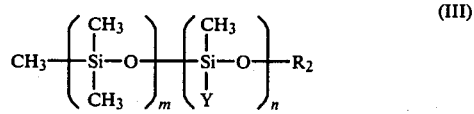

wherein Y is

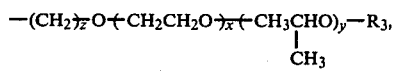

m and n represent positive integers being smaller than 200, x and y represent 0 or positive integers being smaller than 200 and z represents 0 or a positive integer of 1 to 5 to satisfy the formula $0.1 \leq (xn+yn/2m+n) \leq 10$, $R_2$ represents

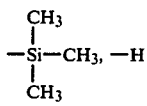

or an alkyl, acyl or aryl group having 1 to 6 carbon atoms and $R_3$ represents —H or an alkyl, acyl or aryl group having 1 to 6 carbon atoms and (d) 10 to 1900 parts by weight per 100 weight parts of said monomer mixture of at least one organic solvent capable of forming a uniform solution by mixing with said monomer mixture.

Synthetic resin moldings high in abrasion resistance and surface smoothness are prepared by applying this coating composition to the surface of the synthetic resin molding and then irradiating it with actinic radiation to form a cross-linked hardened film on the surface of the synthetic resin molding.

These coating compositions are prepared by admixing a specific trifunctional or higher (meth)acrylate monomer, a monomer having one (meth)acryloyloxy group and a silicon type surface active agent. The compositions form a transparent, cross-linked hardened film high in abrasion resistance, surface smoothness, flexibility, water resistance, heat resistance, chemicals resistance and having good adhesion to the base upon irradiation with actinic radiation. Cross-linked hardened films formed from said composition have a high abrasion resistance not only under large loads but also under small loads. The use of these coating compositions which contain small quantities of silicon type surface active agents consistently form a stable, smooth, uniform, cross-linked hardened film. This surface treatment can be applied to such resin moldings, as polycarbonates which are likely to be attacked by solvents and on which a transparent, hard film has been difficult to form due to the whitening of the film.

DESCRIPTION OF THE PREFERRED EMBODIMENTS

The poly(meth)acrylate of mono or polypentaerythritols of formula (I) have a very high polymerizing activity and upon irradiation with actinic rays even in air form a cross-linked hardened polymer exhibiting high abrasion resistance. The preferred polyfunctional monomers of formula (I) are pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tri(meth)acrylate, tripentaerythritol tetra(meth)acrylate, tripentaerythritol penta(meth)acrylate and tripentaerythritol hexa(meth)acrylate. Particularly, the tri, tetra, penta or hexacrylates of dipentaerythritol are preferred because of their polymerizing activity upon irradiation with actinic energy in air and the handling ease imparted by their low viscosity. Two or more of the polyfunctional monomers of formula (I) may be used in admixture.

The amount of polyfunctional monomer is from about 30 to 90% by weight, preferably 35 to 88% by weight in the monomer mixture. When the amount of the polyfunctional monomer is less than about 30% by weight in the monomer mixture (a), a hard film having a sufficient abrasion resistance will not be obtained. When it exceeds 90% by weight, the smoothness of the film will be reduced.

Further, polyfunctional monomers which have at least three (meth) acryloyloxy groups in one molecule but which do not satisfy formula (I) as, for example, trimethylolpropane tri(meth)acrylate, trimethylolethane tri(meth)acrylate or pentaglycerol tri(meth)acrylate are so low in the polymerizing activity that irradiation with actinic energy in air does not adequately cross-link and harden film coatings containing these monomers.

When polyfunctional monomers not satisfying formula (I) are used, the good effects of improved smoothness and uniformity of the film obtained by the use of silicon type surface active agents will be reduced.

The monofunctional acrylate or methacrylate which is to be used together with the polyfunctional monomer of formula (I) and which has at least one ether bond in one molecule, a boiling point above 150° C. under normal pressure and a viscosity below 20 centipoises at 20° C. is essential to give high flexibility, adhesion and smoothness to the cross-linked hard film. Typical monofunctional (meth)acrylates are 2-ethoxyethyl (meth)acrylate, 3-ethoxypropyl (meth)acrylate, 2-butoxyethyl (meth)acrylate, phenoxyethyl (meth)acrylate, 2-(2-methoxyethoxy) ethyl (meth)acrylate, 2-(2-ethoxyethoxy)ethyl (meth)acrylate (alias ethylcarbitol (meth)acrylate), 2-(2-butoxyethoxy)ethyl (meth)acrylate (alias butylcarbitol (meth)acrylate), 2-(2-chloroethoxy)ethyl (meth)acrylate, tetrahydrofurfuryl (meth)acrylate, 2-tetrahydrofurfuryloxyethyl (meth)acrylate, 2-glycidyloxyethyl (meth)acrylate and 2-(2-(2-hydroxyethoxy)ethyl (meth)acrylate. In addition, such monomers in which the ether bond is a cyclic ether bond or which has at least two ether bonds and an acryloyloxy group, may be used, such as tetrahydrofurfuryl acrylate, 2-tetrahydrofurfuryloxyethyl acrylate, ethylcarbitol acrylate, butylcarbitol acrylate and 2-(2-(2-hydroxyethoxy)-ethoxy)ethyl acrylate are particularly high in the hardenability when irradiated with actinic radiation in air.

These monofunctional monomers can be used singly or in admixture with two or more of them. The amount of the monofunctional monomer is from about 10 to about 70% by weight in the monomer mixture (a). When the amount is less than about 10% by weight, the flexibility, adhesion and smoothness of the hard, cross-linked film will be low. When it exceeds about 70% by weight, it is not possible to obtain a hard, cross-linked film having a sufficient abrasion resistance.

The silicon type surface active agent of formula (II) or (III) in which the molecular structure consists of a polydimethylsiloxane unit partly modified with a polyoxyalkylene group is used. A modification degree in which at least one oxyalkylene group

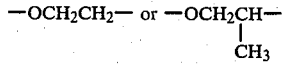

is bonded within a range of 0.1 to 10.0 units with one unit $CH_3(SiO)_{\frac{1}{2}}-$ of a methylsiloxane group is preferred. Less than 0.1 unit of an ester group, mercapto group, hydroxyl group or amino group may be contained in one unit of a siloxane group.

When the modification degree by the oxyalkylene group is less than 0.1 for one unit of the methylsiloxane group, the smoothness of the film will be lower than when no silicon type surface active agent is added. When the modification degree exceeds 10.0, the smoothness of the film will be reduced.

The amount of silicon type surface active agent is preferably from 0.0001 to 2.0 parts by weight per 100 parts by weight of the total amount of monomer mixture (a). When it is less than 0.0001 part by weight, the effect of the addition will be low. When it exceeds 2.0 parts by weight, the smoothness of the film will be low.

An additional, excellent effect of adding such silicon type surface active agents is the whitening prevention and debubbling of the film. Thus, when coating resins low in solvent resistance such as an AS resin, polycarbonate resin or ABS resin, if a large amount of a solvent good for such resin is used as the diluent for conventional coating compositions, the cross-linked film may whiten after being irradiated with actinic energy. However, even in such cases, if a small amount of such silicon type surface active agent as described previously is added and used together, the whitening of the film will be prevented and a transparent cross-linked film will be obtained.

It has been reported that fluorine type surface active agents are effective to improve the smoothness of the film surface. While they improve the smoothness of the film to some extent, they have an undesirable action of stabilizing bubbles produced during the step of mixing or applying the coating composition and these bubbles will not disappear even after the elapse of a long period of time. Therefore, when a coating composition containing fluorine type surface active agents is applied to a synthetic resin molding, the bubbles produced in the film will be difficult to eliminate. When the film is hardened, the bubbles will remain as such in the film and the uniformity of the thus formed film will be quite low.

On the other hand, with silicon type surface active agents, the debubblability is so high that substantially no bubbles will be produced in the coating film or, even if bubbles are produced, they will be immediately extinguished. Further, when a synthetic resin molding is coated by dipping in a coating solution in which bubbles are produced, the bubbles will not be deposited on the molding.

An organic solvent is required to improve the workability of the coating composition when applying the coating composition to the surface of synthetic resin moldings to form a uniform film and to obtain a very high adhesion of the hard, cross-linked film to the base.

The organic solvent which may be used in the present invention is one which:
1. forms a uniform solution upon being mixed with a (meth)acrylate monomer mixture (a);
2. has a boiling point under normal pressure of between 50° to 200° C.;
3. has a viscosity at normal temperature which is below 10 centipoises; and
4. is used in an amount of 10 to 1900 parts by weight per 100 parts by weight of the (meth)acrylate monomer mixture (a).

The first condition is to form a uniform solution with the monomer mixture. Saturated hydrocarbon-type organic solvents as, for example, n-hexane, n-heptane or cyclohexane do not form a uniform solution and therefore cannot be used. The second condition of the boiling point of between 50° to 200° C. under normal pressure is an important and necessary requirement to form a hard, cross-linked film having excellent uniform film formation or surface smoothness when it is applied to the surface of synthetic resin moldings. When the boiling point under normal pressure is less than 50° C., after the coating composition is applied, the base surface will be cooled by the latent heat of the organic solvent, the moisture in air may condense on the surface and the surface smoothness of the coating film will be lost. When it exceeds 200° C., there will be defects that, on the contrary, the volatilization of the organic solvent from the coating film will be so slow that the workability will be low, the volatilization and escape of the remaining organic solvent and the formation of the hard, cross-linked film by the polymerization in the actinic radiation step will not be balanced with each other, therefore, the uniformity and surface smoothness of the hard, cross-linked film will be lost and the organic solvent will remain in the hard, cross-linked film which will whiten the film. Therefore, the boiling point of the organic solvent should be 50° to 200° C. under normal pressure and is preferably 60° to 150° C.

Further, the viscosity of the organic solvent to be used must be below 10 centipoises at normal temperature. When it exceeds 10 centipoises, the effect of the solvent on the coating workability or the film smoothness will be low.

The amount of organic solvent to be used is as described above. When it is less than 10 parts by weight, the viscosity of the coating composition will be so high that the coating workability by dipping will not be sufficient, the thickness of the coating film will be difficult to control and a uniform film will not be formed. On the other hand, when it exceeds 1900 parts by weight, the thickness of the cross-linked hardened film will be difficult to control, the surface smoothness will be lost and the abrasion resistance will be low.

The organic solvent to be used must satisfy the foregoing conditions. Such organic solvents include alcohols such as ethanol, isopropanol, normal propanol, isobutyl alcohol and normal butyl alcohol, aromatic hydrocarbons such as benzene, toluene, xylene and ethylbenzene, ketones such as acetone and methylethyl ketone, ethers such as dioxane and esters such as ethyl acetate, n-butyl acetate and ethyl propionate. These organic solvents may be used singly or two or more may be used in admixture if the boiling point and composition rates of the mixture are in the range described previously.

Polymerizable monomers such as methyl acrylate, ethyl acrylate, methyl methacrylate or styrene which can satisfy the conditions specified for the organic solvent and which have the same effect, may be used as an organic solvent if desired.

Depending upon the type of synthetic resin base or molding, the organic solvent may cloud transparent resins, may dissolve out the dyeing pigment to discolor the colored resin bases or molding or may crack the base or molding. Therefore, it is desirable to properly select the organic solvent to be used in response to the type or use of the resin base or molding.

The preferred method of hardening the coating composition on the surface of a synthetic resin molding to form a hard, cross-linked film is to irradiate it with actinic radiation, preferably with ultraviolet radiation and more particularly, by irradiation with ultraviolet rays having a wave length of 2000 to 8000 Angstroms.

When hardening the coating film by irradiating it with ultraviolet rays, it is necessary to add a sensitizing agent into the coating composition. Suitable sensitizing agents are carbonyl compounds such as, for example, benzoin, benzoin methylether, benzoin ethylether, benzoin isopropylether, acetoin, butyloin, toluoin, benzil, benzophenone, p-chlorobenzophenone, p-methoxybenzophenone, methylphenylglyoxylate, ethylphenylglyoxylate and n-butylphenylglyoxylate, sulfur compounds such as tetramethylthiulum monosulfide and tetramethylthiulum disulfide, azo compounds such as azobisisobutylonitrile and azobis-2,4-dimethylvaleronitrile and peroxide compounds such as benzoyl peroxide and ditertiarybutyl peroxide. These photosensitizing agents may be used singly or as a combination of two or more of them.

The amount of the photosensitizing agent added is from 0.01 to 10 parts by weight per 100 parts by weight of the monomer mixture (a). The addition of a too large amount will color the hard, cross-linked film or reduce the weather resistance of the film.

The coating compositions of the present invention may contain such additives as antistatic agents, ultraviolet ray absorbents, storage stabilizers, or chemical agents for improving abrasion resistance under a small load.

Agents which improve abrasion resistance under a small load are particularly effective to improve abrasion resistance under a load of about 5 to 50 $g/cm^2$.

Since the synthetic resin moldings are exposed in practical use to abrasion under different conditions, evaluation of the abrasion resistance of the moldings under one particular condition is not sufficient. For instance, since sunglasses or lenses are often wiped with a handkerchief or tissue paper to which dusts and other substances adhere, evaluation with a cloth having fine particles on it under a small load is effective and pertinent to show their real economical value. In other words, the test for the abrasion resistance with a steel wool in hand, in which a sample is rubbed with the steel wool by force corresponding to a load of larger than about 50 $g/cm^2$ and determined by naked eyes, is less pertinent and less accurate with respect to sunglasses or lenses than the test previously described.

It has been found that when the coating composition contains an alkyl ester of a straight chain higher saturated fatty acid, glasses and lenses having a high abrasion resistance even under a small load can be obtained. The ester is preferably an ester of a straight chain saturated fatty acid having 14 to 18 carbon atoms with a monohydric alcohol having 3 to 10 carbon atoms containing a hydrocarbon side chain. Suitable esters include isobutylmyristate, n-butylpalmitate, isobutylstearate, isobutylpalmitate, isooctylpalmitate and methyloleate. The preferred esters are isobutylpalmitate and isooctylpalmitate.

The esters comprise from 0.05 to 3% by weight in the monomer mixture. When the amount exceeds 3% by weight, the hardened film will become hazy. Conversely, when the amount is less than 0.05% by weight, the abrasion resistance under a small load will be reduced. The ester is usually ineffective to improve the abrasion resistance under a large load, but it will not adversely effect such abrasion resistance.

When the coating composition of the present invention contains an agent for improving abrasion resistance under a small load, a phenylglyoxylic acid ester represented by the following formula (IV) is preferably used as photosensitizing agent:

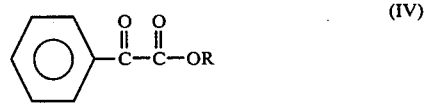
(IV)

wherein R is an alkyl group of 1 to 10 carbon atoms.

When the ester of a straight chain saturated fatty acid is used together with the phenylglyoxylic acid ester, the abrasion resistance under a small load will be further increased.

The dipping method is the most desirable one for coating synthetic resin moldings with the coating composition, because the dipping method is adapted to form a uniform film high in surface smoothness.

The thickness of the hard, cross-linked film which is formed on resin moldings depends on the amount of the monomer mixture contained in the coating composition or the end use of the resin moldings. It is desirable that the coating composition is applied to the molding so that the thickness of the hard, cross-linked film formed on the surface of the synthetic resin molding is in the range of 1 to 30 microns. When the thickness of the cross-linked hardened film formed on the surface of the synthetic resin molding is less than 1 micron, the abrasion resistance may be unsatisfactory for some uses. When it exceeds 30 microns, the flexibility of the hardened film will be reduced such that cracks may form in some applications and therefore the strength of the molding itself will be reduced.

When the coating composition is applied by dipping, the thickness, uniformity and smoothness of the film may be easily adjusted by varying the amount of the monomer, the viscosity of the composition and the speed of pulling up the molding from the dipping tank. Needless to say, though restricted to some extent depending upon the shape of the synthetic resin molding, the dipping method has advantages that not only the coating of the work is simple, the loss of the coating composition is low and the workability or productivity is high but also the reproducibility of the film is high. However, other coating techniques may be used if desired, such as spraying, brush, roller, and the like.

In order to cross-link and harden the applied film, as described above, ultraviolet rays having a wave length of 2000 to 8000 Angstroms are preferred. The irradiating atmosphere is not critical and may be the ordinary atmosphere. Needless to say, if readily available, inert gases such as nitrogen, carbon dioxide or helium or an atmosphere in which the oxygen concentration is reduced will do. The irradiating atmosphere may be at normal temperature or may be warmed so as not to detrimentally deform the base comprising the synthetic resin molding.

Synthetic resin moldings which may be treated in accordance with the present invention include such various types of molded synthetic resins which may be either thermoplastic or thermosetting as sheet-shaped moldings such as glazing plates and injection moldings such as mirrors, film-shaped moldings, rod-shaped moldings, artificial tooth, lens moldings and illuminating device covers, all of which are made of such resins as, for example, polymethyl methacrylates, polycarbonates, polyallyldiglycol carbonates, polystyrenes, acrylonitrile-styrene copolymers (AS), polyvinyl chlorides, acetates, ABS and polyesters.

Among these moldings, the moldings made of such resins as polymethyl methacrylate, polycarbonate and polyallydiglycol carbonate are primarily used due to their excellent optical properties, heat resistance and shock resistance have a long standing need for the improvement of their abrasion resistance.

The foregoing moldings can be used as they are. However, as required, they may be used after applying such conventional pretreatments as washing, etching, corona discharge, active energy ray irradiation, dyeing, printing and the like.

The synthetic resin moldings produced by the present invention are high in smoothness and appearance and are very high in surface hardness, abrasion resistance and scratch resistance. Further, the hard, cross-linked film formed on the molding surface is transparent, uniform and flexible, and is very high in the adhesion to the resin based, is not likely to be peeled off and cracked even under severe environmental conditions. Therefore, the moldings obtained according to the present invention are very useful for such uses as window glazing, illuminating device covers, reflectors, mirrors, spectacles, sunglasses and optical lenses.

Having generally described this invention, a further understanding can be obtained by reference to certain specific examples which are provided herein for purposes of illustration only and are not intended to be limiting unless otherwise specified.

The measurements and evaluations in the examples were made by the following methods:
(1) Abrasion resistance:
(a) Surface hardness—pencil hardness according to JIS K 5400.
(b) Rubbing test—hand rubbing test with steel wool #000.
  O—the surface is not substantially scratched when lightly rubbed
  Δ—the surface is a little scratched when lightly rubbed
  X—the surface is severely scratched (as severely as the base resin would be if not coated) even when lightly rubbed (even when the sample is lightly rubbed, it is rubbed by force corresponding to a load of larger than 50 g/cm$^2$).
(c) Rubbing test under a small load—a wool felt to which silicon carbide #1000 mesh adhered is placed on the sample surface under a load of 130 g/3.14 cm$^2$. The load is given with a steel cylinder of a diameter of 20 mm. The sample is then put in reciprocating motion. The number of reciprocations at which the sample shows a haze of 3% as measured with a Hazemeter is determined. The larger the number, the higher the abrasion resistance.
  Method A: The sample is first washed with a detergent and then with water before the rubbing test.
  Method B: The sample is not washed at all before the rubbing test.
(2) Adhesion:
Cross-cut cellophane tape peeling test on the cross-linked hardened film. 11 film cutting lines reaching through the film to the base resin are made at intervals of 1 mm respectively horizontally and vertically to make 100 meshes of 1 mm$^2$ on the film and cellophane tape is pasted on them and is quickly peeled off. This operation of the cellophane tape is repeated three times in the same place.
  O—even when it is repeated three times, there is no peeling of the mesh of the cross-linked set film
  Δ—1 to 50 peeled meshes after it is repeated three times
  X—51 to 100 peeled meshes after it is repeated three times.
(3) Measurement of the smoothness of the surface:
(a) Sighting method:
  ⊙ —the smoothness of the surface of the film is so high as to be said to be of a mirror surface
  0—the smoothness of the surface of the film is high but has a delicate distortion and cannot be said to be of a mirror surface
  X—the surface has distortion and is low in the smoothness.
(b) Focal power:
  Measured by using a lens meter (JIS B 7183-1975).
  The smaller the absolute numberical value, the higher the smoothness of the surface.
(c) Cylindrical power:
  Measured by using a lens meter (JIS B 7183-1975). The smaller the absolute numerical value, the higher the smoothness of the surface.

(d) Definition:

By using a telescope of a magnification of 10 times, an NBS Resolution Test Chart is resolved from a distance of 5 m, through a sample placed in front of the telescope and the definition is represented by the numerical value of the Resolution Test Chart. The larger the numerical value, the higher the definition of the sample.

(4) Method of testing the smoothness stability of the film before being hardened with ultraviolet rays:

The smoothness is judged according to (3).

Test A: Warm air at 60° C. and a velocity of 2 m/sec is blown for 5 minutes at right angles with the base surface just after the film is formed and before being hardened with ultraviolet rays and then the smoothness stability is judged according to the method of (3).

In the following examples, all reference to parts are parts by weight.

EXAMPLES 1 AND 2 AND CONTROLS 1 AND 2

A 4 mm thick methacrylic resin plate was dipped into a coating composition comprising 10 parts of dipentaerythritol hexacrylate, 20 parts of dipentaerythritol pentacrylate, 4 parts of dipentaerythritol tetraacrylate, 6 parts of ethylcarbitol acrylate, 40 parts of isopropyl alcohol, 20 parts of methylethyl ketone and 0.2 part of the silicon type surface active agent shown in Table 1, was pulled up at a velocity of 0.5 m/sec to form a film, was left standing for 5 minutes and was irradiated on each surface for 10 seconds in air with a high voltage mercury lamp of 2 K.W. from a distance of 15 cm to obtain a resin plate having a film of thickness of 4 microns. The results of tests of the adhesion, surface hardness and surface smoothness of each resin plate are shown in Table 1.

As seen in Table 1, when the silicon type surface active agent of the present invention was not used, a film having a high surface smoothness was not obtained.

TABLE 1

| Kind of Silicon Type Surfactant | Adhesion | Pencil Hardness | Rubbing Test | Surface Smoothness[1] | | | |
|---|---|---|---|---|---|---|---|
| | | | | a | b | c | d |
| Example 1: $CH_3-\left(\begin{array}{c}CH_3\\|\\SiO\\|\\CH_3\end{array}\right)_m-(CH_2CH_2OCH_2CHO)_{\overline{n}}-H$, $CH_3$, $\frac{n}{m}=2$ | 0 | 6H | 0 | ◎ | 0.09 | 0.10 | 68 |
| Example 2: $CH_3-\left(\begin{array}{c}CH_3\\|\\SiO\\|\\CH_3\end{array}\right)_m-\left(\begin{array}{c}CH_3\\|\\Si-O\\|\\CH_2(OCH_2CH_2)_{\overline{23}}-OH\end{array}\right)_{\overline{n}}-H$, $\frac{23n}{2m+n}=3$ | 0 | 6H | 0 | ◎ | 0.11 | 0.12 | 56 |
| Control 1: $CH_3-\left(\begin{array}{c}CH_3\\|\\SiO\\|\\CH_3\end{array}\right)_m-(CH_2CH_2OCH_2CHO)_{\overline{n}}-H$, $CH_3$, $\frac{n}{m}=20$ | 0 | 6H | 0 | X | 0.35 | 0.30 | Impossible |
| Control 2: $CH_3-\left(\begin{array}{c}CH_3\\|\\SiO\\|\\CH_3\end{array}\right)_m-(CH_2CH_2OCH_2CHO)_{\overline{n}}-H$, $CH_3$, $\frac{n}{m}=0.05$ | 0 | 6H | 0 | X | 0.40 | 0.35 | Impossible |

[1] a, b, c and d refer to the smoothness tests discussed under item 8 of the test method section.

EXAMPLE 3 AND CONTROL 3

A mixture consisting of 45 parts of dipentaerythritol hexacrylate, 30 parts of dipentaerythritol triacrylate, 25 parts of tetrahydrofurfuryl acrylate, 4 parts of benzoin ethylether, 100 parts of isopropyl alcohol and 50 parts of toluene was prepared. 0.4 part of a silicon type surface active agent (a) consisting of a polyoxyalkylene modification of polydimethylsiloxane was added to the mixture. A smooth 5 mm thick polycarbonate plate was dipped into the mixture, was pulled up at a velocity of 0.7 cm/sec., was left standing for 10 minutes and was then irradiated for 8 seconds with a high voltage mercury lamp of 5 K.W. from a distance of 20 cm on each surface in air.

Further, a sample was made and compared by the same operation as was mentioned above except the silicon type surface active agent (a) mentioned above was not added. As can be seen from Table 2, the polycarbonate plate according to the present invention in which the silicon type surface active agent was used was higher in smoothness and transparency.

TABLE 2

| | Silicon Type Surfactant[a] | Adhesion | Pencil Hardness | Rubbing Test | Surface Smoothness | | | | Appearance |
|---|---|---|---|---|---|---|---|---|---|
| | | | | | a | b | c | d | |
| Example 3 | Added | 0 | 8H | 0 | ◎ | 0.10 | 0.9 | 68 | Transparent |
| Control 3 | Not added | 0 | 8H | 0 | 0 | 0.21 | 0.18 | 34 | Slightly |

TABLE 2-continued

| Silicon Type Surfactant[a] | Adhesion | Pencil Hardness | Rubbing Test | Surface Smoothness a | b | c | d | Appearance |
|---|---|---|---|---|---|---|---|---|
| | | | | | | | | Milk White |

[a]
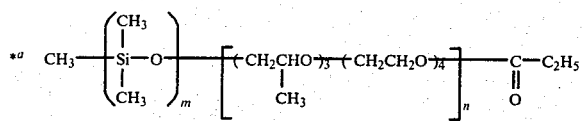

wherein $\frac{7n}{2m} = 1.1$

EXAMPLE 4, REFERENCE 1 AND CONTROLS 4 TO 6:

A smooth, 2 mm thick methacrylic resin plate was dipped into a coating composition prepared by adding such amount as is shown in Table 3 of a silicon type surface active agent (b) consisting of a polyoxyalkylene modification of polydimethylsiloxane to a coating composition comprising 27 parts of dipentaerythritol pentacrylate, 5 parts of butylcarbitol acrylate, 8 parts of tetrahydrofurfuryl acrylate, 1 part of benzoin ethylether, 1 part of p-chlorobenzophenone, 45 parts of n-propyl alcohol and 15 parts of xylene and was pulled up at a velocity of 0.5 cm/sec to form a film on the resin plate. After the plate was left standing quietly for 5 minutes in air, to observe the appearance of the film and test the stability of the film before being hardened with ultraviolet rays, warm air at 60° C. was blown on the plate at a velocity of 2 m/sec by the testing method discussed previously. The sample was then irradiated for 10 seconds with a high voltage mercury lamp of 2 K.W. from a distance of 15 cm on each surface and the appearance of the set film was observed.

The results are shown in Table 3.

EXAMPLES 5 TO 9 AND CONTROLS 7 TO 8

A coating composition was prepared by adding 0.2 part of each of the surface active agents shown in Table 4 to a coating composition comprising 5 parts of dipentaerythritol hexacrylate, 20 parts of dipentaerythritol pentacrylate, 5 parts of dipentaerythritol triacrylate, 7 parts of tetrahydrofurfuryl acrylate, 33 parts of isopropyl alcohol, 30 parts of toluene, 2 parts of benzoin isopropylether and 3 parts of benzophenone. Then this composition was vigorously stirred with a glass rod to form bubbles in it. The rate of debubbling was observed.

Further, a smooth, 2 mm thick polycarbonate resin sheet (Upilon produced by Mitsubishi Gas Chemical Co.) was dipped into the coating composition as bubbled and was pulled up at a velocity of 0.5 cm/sec to observe the state of bubbles deposited on the resin base. Also the thus produced film was hardened with ultraviolet rays with a high voltage mercury lamp of 2 K.W. in air. The appearance of the film after hardening was also observed.

The results are shown in Table 4.

It is found from this table that, when the silicon type surface active agent of the present invention is not used, the resin base will be clouded, that is milk white, the bubbles in the coating composition will not be extin-

TABLE 3

| | Irradiating Atmosphere | Amount of Added Silicon Type Surfactant[b] (in parts) | Smoothness of the Surface Just After Being Dipped and Pulled Up | Observation of the Smoothness of the Surface Tested by Test A and Hardened with Ultraviolet Rays |
|---|---|---|---|---|
| Example 4 | Air | 0.2 | ◎ | ◎ |
| Reference 1 | Nitrogen | 0.2 | ◎ | ◎ |
| Control 4 | Air | — | ◎ | X |
| Control 5 | Air | 5.0 | X | X |
| Control 6 | Air | 0.2 ppm | ◎ | O |

| | Film Performances After Hardening | | | | | | |
|---|---|---|---|---|---|---|---|
| | Adhesion | Pencil Hardness | Rubbing Test | Smoothness of the Surface b | c | d | Remarks |
| Example 4 | 0 | 6H | 0 | 0.10 | 0.09 | 68 | |
| Reference 1 | 0 | 6H | 0 | 0.10 | 0.09 | 68 | |
| Control 4 | 0 | 6H | 0 | 0.55 | 0.30 | Impossible | |
| Control 5 | 0 | 6H | 0 | 0.45 | 0.30 | 12 | The surface was clouded to be milk white, was low in the smoothness and had a disorder |
| Control 6 | 0 | 6H | 0 | 0.20 | 0.15 | 20 | |

[b]
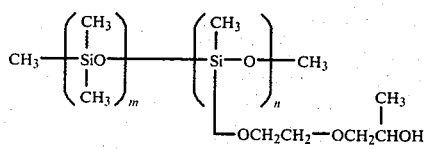

wherein $\frac{2n}{2m + n} = 0.5$ guished for a long time and will be deposited on the base surface and the appearance and smoothness of the film will be low.

TABLE 4

| | Surfactant* | Debubbling of the Coating Composition | Deposition of Bubbles on the Base |
|---|---|---|---|
| Example 5 | Formula (i) below | High | Not deposited |
| Example 6 | Table 3 | High | Not deposited |
| Example 7 | Formula (ii) below | High | Not deposited |
| Example 8 | Formula (iii) below | High | Not deposited |
| Example 9 | Table 2 | High | Not deposited |
| Control 7 | Not added | High | Not deposited |
| Control 8 | Polyoxyethylene fluorocarbon amide | Low (little debubbled within 5 minutes) | Deposited |

| | Performances of the Film After Hardening | | | | | | Pencil | |
|---|---|---|---|---|---|---|---|---|
| | Smoothness | | | | | | | |
| | a | b | c | d | Appearance | Adhesion | Hardness | Rubbing |
| Example 5 | ◎ | 0.08 | 0.09 | 68 | Transparent | 0 | 7H | 0 |
| Example 6 | ◎ | 0.11 | 0.10 | 48 | Transparent | 0 | 7H | 0 |
| Example 7 | ◎ | 0.09 | 0.10 | 56 | Transparent | 0 | 7H | 0 |
| Example 8 | ◎ | 0.07 | 0.08 | 68 | Transparent | 0 | 7H | 0 |
| Example 9 | ◎ | 0.10 | 0.09 | 68 | Transparent | 0 | 7H | 0 |
| Control 7 | 0 | 0.15 | 0.17 | 34 | Transparent | 0 | 7H | 0 |
| Control 8 | X | 0.45 | 0.50 | Impossible | Milk white | 0 | 7H | 0 |

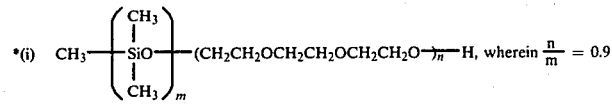

*(i) $CH_3-\left(\begin{array}{c}CH_3\\|\\SiO\\|\\CH_3\end{array}\right)_m-(CH_2CH_2OCH_2CH_2OCH_2CH_2O)_{\overline{n}}-H$, wherein $\frac{n}{m} = 0.9$

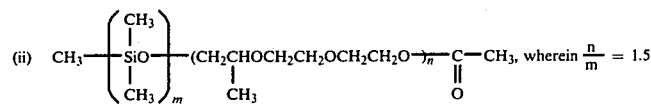

(ii) $CH_3-\left(\begin{array}{c}CH_3\\|\\SiO\\|\\CH_3\end{array}\right)_m-(CH_2CHOCH_2CH_2OCH_2CH_2O)_{\overline{n}}-\overset{O}{\underset{\|}{C}}-CH_3$, wherein $\frac{n}{m} = 1.5$

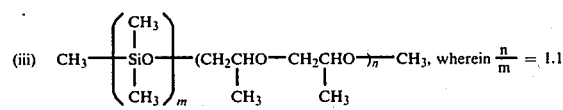

(iii) $CH_3-\left(\begin{array}{c}CH_3\\|\\SiO\\|\\CH_3\end{array}\right)_m-(CH_2CHO-CH_2CHO)_{\overline{n}}-CH_3$, wherein $\frac{n}{m} = 1.1$

EXAMPLES 10 TO 15

The molded plates of Table 5 were dipped into a coating composition comprising 5 parts of tripentaerythritol hexaacrylate, 10 parts of dipentaerythritol pentacrylate, 10 parts of dipentaerythritol triacrylate, 10 parts of 2-butoxyethyl acrylate, 4 parts of benzoin methylether, 0.15 part of the silicon type surface active agent of the formula (iii) in Table 4, 40 parts of isobutyl alcohol and 25 parts of toluene and was pulled up at a velocity of 0.5 cm/sec to form a film. The film was hardened by irradiation with ultraviolet rays from a high voltage mercury lamp of 2 K.W. in air.

The appearance on each molded plate was good and film performances are shown in Table 5.

TABLE 5

| | Base | Smoothness (a) of the Hardened Film | Pencil Hardness | Rubbing | Adhesion |
|---|---|---|---|---|---|
| Example 10 | Polystyrene resin | ◎ | 7H | 0 | 0 |
| Example 11 | Polyethylene resin | ◎ | 7H | 0 | 0 |
| Example 12 | Nylon-6.6 resin | ◎ | 7H | 0 | 0 |
| Example 13 | A S resin | ◎ | 6H | 0 | 0 |
| Example 14 | A B S resin | ◎ | 6H | 0 | 0 |
| Example 15 | P B T resin | ◎ | 7H | 0 | 0 |

EXAMPLE 16

A smooth lens 20 mm in diameter and 2 mm thick made of polymethyl methacrylate was dipped in the coating solution of Example 1 and was hardened by the method of Example 1 to form a hard, cross-linked film 3.2 microns thick. The surface of the lens was very high in smoothness and adhesion and had a pencil hardness of 7 H in the abrasion resistance value.

Controls 9 to 10

A methacrylic resin plate 5 mm thick was dipped into a coating composition comprising 30 parts of trimethylolpropane trimethacrylate, 5 parts of 1,4-butanediol diacrylate, 5 parts of 1,6-hexanediol diacrylate, 40 parts of ethyl alcohol, 20 parts of ethyl benzene, 6 parts of benzoin ethylether and 0.1 part of the silicon type surface active agent of Table 3 and was pulled up at a velocity of 0.7 cm/sec to form a film.

The plate was left standing for 5 minutes in the atmosphere of Table 6 and was irradiated with ultraviolet rays for 10 seconds with a high voltage mercury lamp of 2 K.W. from a distance of 15 cm in each atmosphere.

The results are shown in Table 6.

TABLE 6

| | Atmosphere | Hardening | Smoothness of the Film |
|---|---|---|---|
| Control 9 | Air | Not hardened | X |
| Control 10 | Nitrogen | Hardened | X |

EXAMPLES 17 TO 21 AND CONTROLS 11 TO 12

A smooth methacrylic resin plate 3 mm thick was dipped into a coating solution comprising 20 parts of pentaerythritol hexacrylate, 13 parts of dipentaerythritol pentacrylate, 7 parts of tetrahydrofurfuryl acrylate, 40 parts of isopropyl alcohol, 10 parts of isobutyl alcohol, 10 parts of toluene, 0.2 part of silicon type surface active agent (b) used in Example 4, 0.8 part of photosensitizing agent shown in Table 7, and 0.12 part of an agent for improving abrasion resistance, and was pulled up at a velocity of 0.5 cm/sec to form a film.

The plate was left standing for 3 minutes in air, was irradiated on each surface for 10 seconds in air with a high voltage mercury lamp of 2 K.W. to obtain a resin plate having a hardened film on it.

The results of tests of the abrasion resistance, surface smoothness and adhesion of each resin plate are shown in Table 7.

TABLE 7

| | Photosensitizer (w.t. part) | | | Agent for Improving Abrasion Resistance under a Small Lead (w.t. part) | | | | | Abrasion Resistance | | | | | |
|---|---|---|---|---|---|---|---|---|---|---|---|---|---|---|
| | | | | | | | | | Pencil | | Rubbing(c) | | Smoothness of | |
| | BiP | BNP | EPG | iBP | nBP | MO | SA | DMS | Hardness | Rubbing(b) | a | b | Hardened Film | Adhesion |
| Example 17 | 0.35 | 0.45 | | | | | | | 7H | 0 | 90 | 90 | ◎ | 0 |
| Example 18 | 0.35 | 0.45 | | 0.12 | | | | | 7H | 0 | 130 | 130 | ◎ | 0 |
| Example 19 | 0.35 | 0.45 | | | 0.12 | | | | 7H | 0 | 110 | 110 | ◎ | 0 |
| Example 20 | 0.35 | 0.45 | | | | 0.12 | | | 7H | 0 | 110 | 120 | ◎ | 0 |
| Example 21 | | | 0.8 | 0.12 | | | | | 7H | 0 | 140 | 140 | ◎ | 0 |
| Control 11 | 0.35 | 0.45 | | | | | 0.12 | | 7H | 0 | 80 | 80 | 0 | 0 |
| Control 12 | 0.35 | 0.45 | | | | | | 0.12 | 7H | 0 | 85 | 90 | X | 0 |

BiP: Benzoin isopropylether
BNP: Benzophenone
EPG: Ethylphenyglyoxylate
iBP: Isobutylpalmitate
nBP: n-butylpalmitate
MO: Methyloleate
SA: Stearylmonoglyceride
DMS: Dimethylpolysiloxane 20 centistokes (produced by Mutsumoto Yushi-Setyaku Co., Ltd.)

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A coating composition comprising
  (a) a monomer mixture of 30 to 90% by weight of at least one poly(meth)acrylate of mono or polypentaerythritol having at least three (meth)acryloyloxy groups in one molecule of formula (I)

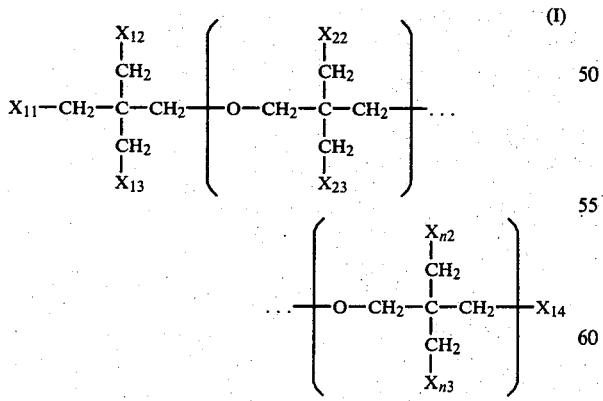

wherein at least three of $X_{11}$, $X_{12}$, $X_{13}$, $X_{22}$, $X_{23}$, ... $X_{n2}$, $X_{n3}$ and $X_{14}$ are $CH_2=CR-COO-$ groups and the rest of them are $-OH$ groups, n is an integer of 1 to 5 and R represents hydrogen or a methyl group, and 70 to 10% by weight of at least one monofunctional acrylate or methacrylate having at least one ether bond in one molecule, a boiling point above 150° C. under normal pressure and a viscosity below 20 centipoises at 20° C.;
  (b) 0.01 to 10 parts by weight of a photosensitizing agent per 100 parts by weight of said monomer mixture;
  (c) 0.0001 to 2.0 parts by weight per 100 parts by weight of said monomer mixture of at least one silicon containing surface active agent of the formula (II) or (III):

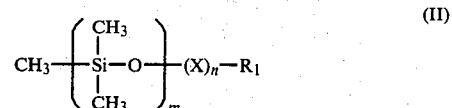

wherein X is

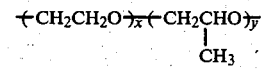

m and n are positive integers being smaller than 200 and x and y represent 0 or positive integers being smaller than 200 and satisfy the formula $0.1 \leq (xn+yn/2m) \leq 10$ and $R_1$ represents $-H$ or an alkyl, acyl or aryl group having 1 to 6 carbon atoms or

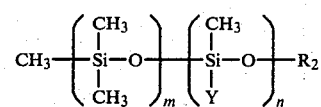

wherein Y is

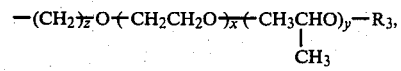

m and n represent positive integers being smaller than 200, x and y represent 0 or positive integers being smaller than 200 and z represents 0 or a positive integer of 1 to 5 and satisfy the formula $0.1 \leq (xn+yn/2m+n) \leq 10$, $R_2$ represents

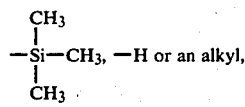

acyl or aryl group having 1 to 6 carbon atoms, and $R_3$ represents —H or an alkyl, acyl or aryl group having 1 to 6 carbon atoms; and (d) 10 to 1900 parts by weight per 100 parts by weight of said monomer mixture of at least one organic solvent capable of forming a uniform solution upon mixing with said monomer mixture.

2. The coating composition of claim 1, wherein said monomer of formula (I) is at least one compound selected from the group consisting of dipentaerythritol triacrylate, dipentaerythritol tetraacrylate, dipentaerythritol pentaacrylate and dipentaerythritol hexaacrylate.

3. The coating composition of claim 1, wherein said monofunctional acrylate or methacrylate has a cyclic ether bond having at least two ether bonds.

4. The coating composition of claim 1, wherein said monofunctional acrylate or methacrylate is at least one compound selected from the group consisting of ethylcarbitol acrylate, butylcarbitol acrylate and tetrahydrofurfuryl acrylate.

5. The coating composition of claim 1, 2, 3 or 4 wherein said organic solvent is a solvent having a boiling point of 50° to 200° C. under normal pressure and a viscosity below 10 centipoises at 20° C.

6. The coating composition of claim 1, wherein said monomer mixture contains 0.05 to 3% by weight of an alkyl ester of straight chain higher saturated fatty acid.

7. The coating composition of claim 6, wherein said alkyl ester of of straight chain higher saturated fatty acid is an ester of a straight chain higher saturated fatty acid having 14 to 18 carbon atoms with a monohydric alcohol having 3 to 10 carbon atoms and containing a hydrocarbon side chain.

8. A process for producing synthetic resin moldings high in abrasion resistance and surface smoothness, which comprises applying a coating composition comprising:

(a) a monomer mixture of 30 to 90% by weight of at least one poly(meth)acrylate of mono or polypentaerythritol having at least three (meth)acryloyloxy groups in one molecule of the formula (I)

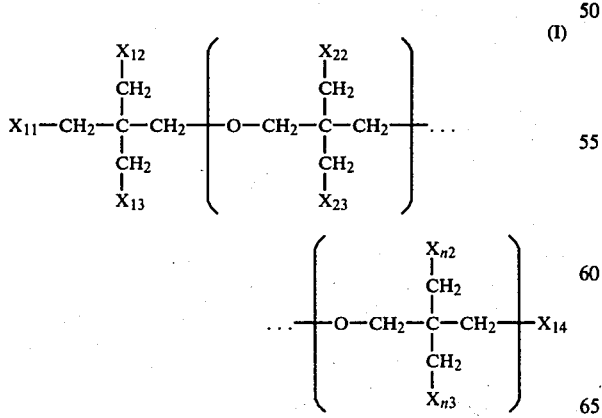

wherein at least three of $X_{11}$, $X_{12}$, $X_{13}$, $X_{22}$, $X_{23}$, ... $X_{n2}$, $X_{n3}$ and $X_{14}$ are $CH_2=CR-COO-$ groups and the rest of them are —OH groups, n is an integer of 1 to 5 and R represents hydrogen or a methyl group, and 70 to 10% by weight of at least one monofunctional acrylate or methacrylate having at least one ether bond in one molecule, a boiling point above 150° C. under normal pressure and a viscosity below 20 centipoises at 20° C.;

(b) 0.01 to 10 parts by weight of a photosensitizing agent per 100 parts by weight of said monomer mixture;

(c) 0.0001 to 2.0 parts by weight per 100 parts by weight of said monomer mixture of at least one silicon containing surface active agent of the formula (II) or (III):

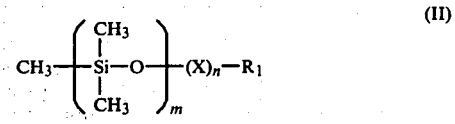

wherein X is

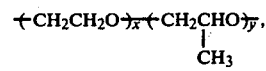

m and n are positive integers being smaller than 200 and x and y represent 0 or positive integers being smaller than 200 and satisfy the formula $0.1 \leq xn + yn/2m \leq 10$ and $R_1$ represents —H or an alkyl, acyl or aryl group having 1 to 6 carbon atoms or

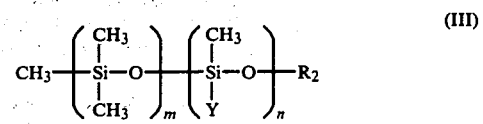

wherein Y is

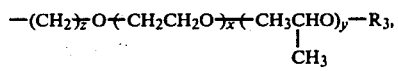

m and n represent positive integers being smaller than 200, x and y represent 0 or positive integers being smaller than 200 and z represents 0 or a positive integer of 1 to 5 and satisfies the formula $0.1 \leq (xn+yn)/2m+n \leq 10$, $R_2$ represents

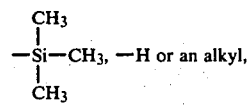

acyl or aryl group having 1 to 6 carbon atoms, and $R_3$ represents —H or alkyl, acyl or aryl group having 1 to 6 carbon atoms; and (d) 10 to 1900 parts by weight per 100 parts by weight of said monomer mixture of at least one organic solvent forming a uniform solution by mixing with said monomer mixture
to coat the surface of a synthetic resin molding and then irradiating with actinic radiation in air to form a hard, cross-linked film on the surface of the synthetic resin molding.

9. The process of claim 8, wherein said monomer of formula (I) is at least one compound selected from the group consisting of dipentaerythritol triacrylate, dipentaerythritol tetraacrylate, dipentaerythritol pentaacrylate and dipentaerythritol hexaacrylate.

10. The process of claim 9, wherein said monofunctional acrylate or methacrylate has a cyclic ether bond or at least two ether bonds.

11. The process of claim 8, wherein said monofunctional acrylate or methacrylate is at least one compound selected from the group consisting of ethylcarbitol acrylate, butylcarbitol acrylate and tetrahydrofurfuryl acrylate.

12. The process of claim 8, wherein said monomer mixture contains 0.05 to 3% by weight of an alkyl ester of straight chain higher saturated fatty acid.

13. The process of claim 12, wherein said alkyl ester of straight chain higher saturated fatty acid is an ester of a straight chain higher saturated fatty acid having 14 to 18 carbon atoms with a monohydric alcohol having 3 to 10 carbon atoms and containing a hydrocarbon side chain.

* * * * *